US011918057B1

(12) United States Patent
Charbonnet

(10) Patent No.: US 11,918,057 B1
(45) Date of Patent: Mar. 5, 2024

(54) UNDERGARMENT EMBODYING AN INTERNAL COMPARTMENT TO SUPPORT AND SHIELD MALE GENITALIA FROM RADIATION AND THE WEARER'S THIGHS

(71) Applicant: Daniel Fortier Charbonnet, San Mateo, CA (US)

(72) Inventor: Daniel Fortier Charbonnet, San Mateo, CA (US)

( * ) Notice: Subject to any disclaimer, the term of this patent is extended or adjusted under 35 U.S.C. 154(b) by 0 days.

(21) Appl. No.: 18/331,334

(22) Filed: Jun. 8, 2023

(51) Int. Cl.
*A41B 9/00* (2006.01)
*A41B 9/02* (2006.01)
*G21F 3/02* (2006.01)

(52) U.S. Cl.
CPC .............. *A41B 9/023* (2013.01); *A41B 9/026* (2013.01); *G21F 3/02* (2013.01)

(58) Field of Classification Search
CPC ............ A41B 9/023; A41B 9/026; G21F 3/02
See application file for complete search history.

(56) References Cited

U.S. PATENT DOCUMENTS 2,235,849 A * 3/1941 Reis ........................ A41B 9/02 2/234
2,601,602 A * 6/1952 Firsching, Sr. ........ A41B 9/023 2/403
6,038,703 A * 3/2000 Chung ..................... A61F 5/40 2/403
6,061,840 A * 5/2000 Alligator ................ A41B 9/023 2/403
7,434,273 B2 * 10/2008 Chung .................. A41B 9/023 2/403
D646,462 S * 10/2011 Ellis ...................... A41B 9/026 D2/742
9,687,030 B2 * 6/2017 Bigney .................... A41B 9/02
9,907,342 B2 * 3/2018 Fisher .................... A41D 27/20
9,924,746 B1 * 3/2018 Davis ..................... A41B 9/023
10,342,266 B2 * 7/2019 Oh ........................ A41B 9/023
10,980,289 B2 * 4/2021 Ng ........................ A41B 9/023
11,272,744 B2 * 3/2022 Shaughnessy ......... A41B 9/004
11,553,737 B1 * 1/2023 Hong ..................... A41B 9/023
2007/0277285 A1 * 12/2007 Gravette ............... A41B 9/023 2/78.1
2016/0100635 A1 * 4/2016 Rankin .................. A41B 9/026 2/408
2018/0007975 A1 * 1/2018 Crump ................... A41B 9/001
2019/0090552 A1 * 3/2019 Crump ................... A41B 9/023
(Continued)

*Primary Examiner* — Richale L Quinn
(74) *Attorney, Agent, or Firm* — Dunlap Bennett & Ludwig, PLLC

(57) ABSTRACT

An undergarment having an internal pouch for shielding male genitalia from radiation as well as separating the scrotum from the inner thighs, the undergarment providing a crotch gusset defining an anterior opening of the undergarment. An anterior panel depends from the waistband of the undergarment adjacent to the anterior opening. A barrier layer extends downwardly in a sloped configuration between the waistband and a posterior portion of the crotch gusset. A longitudinal slit formed in and centrally located in the barrier layer allows the male genitalia to be received in a phallic pouch defined by the anterior panel. A lateral connection between each of two opposing lateral edges of the barrier layer and the crotch gusset defines a gap between the anterior panel and the barrier layer as well as define a scrotal pouch disposed posterior to pendulous pouch.

13 Claims, 4 Drawing Sheets

(56) References Cited

U.S. PATENT DOCUMENTS

| | | | | |
|---|---|---|---|---|
| 2019/0110523 | A1* | 4/2019 | Gu | A41B 9/023 |
| 2019/0124999 | A1* | 5/2019 | Crump | A41B 9/026 |
| 2019/0191784 | A1* | 6/2019 | Crump | A41B 9/026 |
| 2019/0246706 | A1* | 8/2019 | Fortier | A41B 9/026 |
| 2019/0307178 | A1* | 10/2019 | Polynski | A41B 9/026 |
| 2020/0060353 | A1* | 2/2020 | Crump | A41B 9/023 |
| 2020/0237020 | A1* | 7/2020 | McCombs | A41B 9/023 |
| 2022/0408847 | A1* | 12/2022 | Mendoza | A41B 9/026 |

* cited by examiner

UNDERGARMENT EMBODYING AN INTERNAL COMPARTMENT TO SUPPORT AND SHIELD MALE GENITALIA FROM RADIATION AND THE WEARER'S THIGHS

CROSS-REFERENCE TO RELATED APPLICATION

This application claims the benefit of priority of U.S. non-provisional application Ser. No. 29/870,539, filed Jan. 30, 2023, as a Continuation thereof, the contents of which are herein incorporated by reference.

BACKGROUND OF THE INVENTION

The present invention relates to protective undergarments and, more particularly, to an undergarment embodying an internal pouch to protect male genitalia from radiation and separate the genitals from the wearer's thighs.

When wearing lower undergarments, the location and pendulous nature of male genitalia presents at least two problems.

First, located protuberantly in relation to the anterior surface of a person's midsection, male genitalia are on the forefront of bombarding electromagnetic radiation emitted from electronic devices. As a result, the penis and testicles are constantly absorbing electromagnetic radiation from all directions; for instance, most cell phones are kept in the pockets of pants, which are located within inches of the male genitals. Similarly, laptop computers are placed on top of the thighs and are therefore located within a few inches of the male genitals.

Second, male genitals tend to stick to inner thighs due to a combination of weather conditions (for instance, hot and humid weather) and the body's natural resting positions (for instance, standing, sitting, walking), creating discomfort. Usually, this discomfort results in requiring the male to manually separate their genitals from their thighs by tugging the genitals or by separating their legs in a distance wide enough for the genitals to become unstuck from the thighs: social norms dictate that such correction be done covertly when in public.

The primary deficiencies with current apparatus aimed at solving the above-mentioned radiation-bombardment problem is that they simply take existing standard underwear designs (which do not have an internal pouch for the male genitals) and replace the fabric with (or add an additional layer thereon) radiation-blocking fabric. Therefore, current designs of radiation-blocking underwear do not sufficiently protect the male genitals from radiation from all angles due to the large openings in the standard underwear design (leg and waistband openings). Furthermore, this approach of swapping out for or adding an additional layer of radiation-blocking fabric requires a significant amount of fabric to construct the entire underwear, and radiation-blocking fabric is expensive to produce; therefore, the current solutions are expensive for consumers relative to standard underwear due to the high consumption of radiation-blocking fabric. Moreover, these existing radiation-blocking undergarments use a standard undergarment design without an internal enclosure for the male genitalia. Additionally, the primary problems with current apparatus aimed at solving the issue of the male genitals sticking to inner thighs is that the internal pouch that is added does not sufficiently and effectively keep the male genitals from falling out of the pouch, thus making contact with the inner thighs. When the wearer is standing still, the current apparatuses seem to work, but as soon as the wearer walks, runs or sits, the male genitals fall out of the pouch.

As can be seen, there is a need for an undergarment embodying an internal pouch to protect male genitalia from radiation and separate the genitals from the wearer's thighs.

SUMMARY OF THE INVENTION

The present invention provides an undergarment embodying two components for shielding male genitalia from deleterious radiation. The first component is an internal pouch enclosure (where the male genitals reside), wherein the enclosure is made with radiation-blocking fabric, creating an internal compartment that surrounds and protects the male genitals from radiation from almost all angles (front, sides, top, bottom and back). In other words, the present invention provides a full protective shield around the male genitals from all directions. The internal pouch is made with radiation-blocking fabric that blocks most electric and magnetic fields (EMFs) from passing through the fabric and reaching the male genitalia.

The second component of the present invention includes an anterior panel of radiation-blocking fabric that is used to make the front crotch part of an underwear design so that the anterior panel disposed between the wearers' genitalia and the external environment).

The internal pouch with radiation-blocking fabric is constructed and connected to the undergarment in a way that allows the male genitalia to pass through an opening in the radiation-blocking fabric into an enclosure that is made entirely of the radiation-blocking fabric so that the genitalia is surrounded by the radiation-blocking fabric. The anterior panel of radiation-blocking fabric blocks radiation from the front, top and bottom directions because when the undergarment is worn, the radiation-blocking anterior panel wraps around the front, top and bottom of the male genitalia. Because the male genitals pass through an opening in a radiation-blocking barrier layer and into an enclosure, the radiation-blocking fabric of the enclosure also acts as a barrier between the male genitals and the thighs so that there is no contact between the male genitals and the thighs.

The present invention has a radiation-blocking design that is significantly smaller in surface area than the prior and current apparatus, but more effective at surrounding the male genitals from almost all angles. As a result, the present invention requires approximately eight times less radiation-blocking fabric to create than current apparatus. This allows the present invention to be produced much cheaper than the current apparatus, and therefore can be sold to consumers at a much lower price.

In one aspect of the present invention, undergarment having an internal pouch for shielding male genitalia from radiation, the undergarment further includes a crotch gusset interconnecting two leg holes of the undergarment, wherein an anterior edge of the crotch gusset defines an anterior opening of the undergarment; an anterior panel depending from a superior portion of the undergarment adjacent the anterior opening; a barrier layer extending in a sloped configuration between said superior portion to a posterior portion of the crotch gusset; a longitudinal slit formed in and centrally located in the barrier layer; an inferior edge of the anterior panel connected to said anterior edge of the crotch gusset so as to form a phallic pouch therebetween; and a lateral connection between each of two opposing lateral edges of the barrier layer and the crotch gusset, wherein the lateral connections extend between said anterior edge and said posterior portion of the crotch gusset, thereby defining a gap between each lateral connection and the anterior panel, and wherein the barrier layer defines a scrotal pouch disposed posterior to said anterior edge.

In another aspect of the present invention, the undergarment further provides the following: wherein the phallic pouch is configured to accommodate a penis of a wearer of the undergarment, wherein the scrotal pouch is configured to accommodate a scrotum of the wearer of the undergarment, wherein the anterior panel and the barrier layer comprise radiation blocking material, wherein an anterior connection directly connects the barrier layer and the superior portion, wherein a posterior connection directly connects the barrier layer and said posterior portion further providing a front panel depending directly from said superior portion, wherein an inferior edge of the front panel defines, in part, a superior edge to the anterior opening, wherein a superior edge of the anterior panel directly connects to the front panel, wherein the superior portion is a waistband, and wherein the waistband is superior to a superior edge of the anterior panel.

These and other features, aspects and advantages of the present invention will become better understood with reference to the following drawings, description and claims.

DETAILED DESCRIPTION OF THE INVENTION

Figure 1:
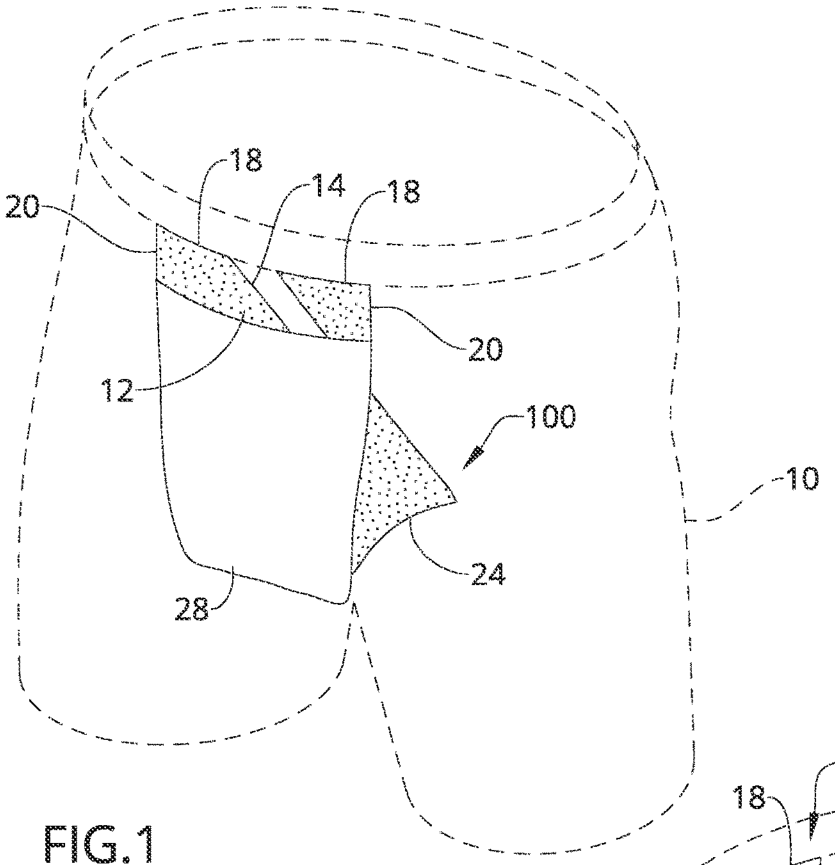
FIG. 1 is a front perspective view of an exemplary embodiment of the present invention, with the remainder of the undergarment shown in dashed lines or otherwise hidden for the sake of clarity.
Figure 2:
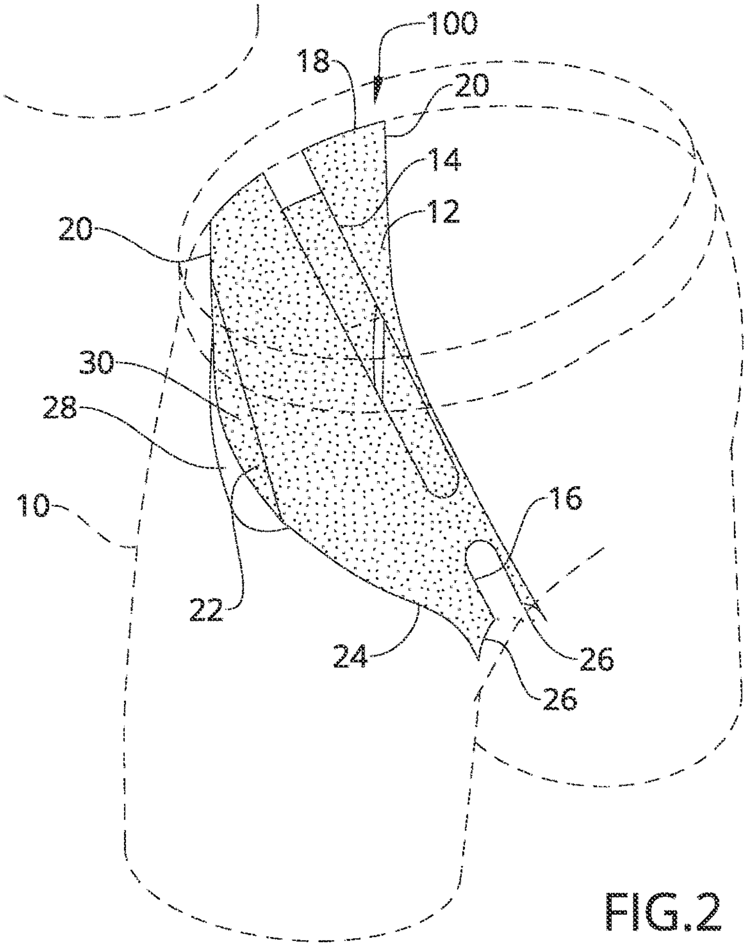
FIG. 2 is a rear perspective view of an exemplary embodiment of the present invention.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Referring to FIGS. 1 through 8, the present invention provides an internal compartment 100 embodied in an undergarment 10 for supporting and protecting male genitalia 34, 36.

The undergarment 10 may have the typical elements of an undergarment, including a waistband 60 to engage the waist of the wearer. Though it is understood that the waistband 60 may, in some embodiments, not be an identifiable band, but merely an upper periphery of the undergarment. From the waistband 60 a front panel 50 and rear panel 70 depend. Typically, these front and rear panels depend from a waistband seam, though not in all embodiments. Bottom peripheries of these front and rear panels define, in part left and right leg holes 90. A crotch gusset 80 interconnects these left and right leg holes 90 along a medial, inferior portion of the undergarment 10. The rearward latitudinal edge of the crotch gusset 80 is attached to the rear panel 70 by way of the rear seams 87.

The internal compartment 100 includes a barrier layer 12 spanning the crotch region of the undergarment 10, along the interior thereof. The barrier layer 12 extends from an anterior point 18 to a posterior connection point(s) 26 of said interior of the undergarment 10. The anterior connection point 18 may be adjacent or at the waistband of the undergarment 10. In some embodiments, the anterior connection point 18 may be along a waistband seam. The posterior connection point(s) 26 are at a substantial lower elevation along the crotch reach of the undergarment 10, thereby resulting in the barrier layer 12 sloping downward at an approximately 45-degree angle as it extends from the anterior point 18. The posterior connection point(s) 26 may be along the rear seam 87 of the crotch gusset 80.

A superior lateral connection point 20, on each side of the barrier layer 12, may connect a superior portion of a lateral edge the barrier layer 12 to a front panel 50 of the undergarment 10. An inferior lateral connection point 24, on each side of the barrier layer 12, may connect inferior portions of the lateral edge of the barrier layer 12 to the crotch gusset 80 of the undergarment 10 adjacent to the wearer's perineum is. The inferior lateral connection points 24 extend from the posterior connection points 26 toward the respective superior lateral connection point 20, but not all the way thereto, thereby defining a gap 22 (or unconnected edge of the barrier layer 12) therebetween. The gap 22 exists between the anterior superior lateral connection point 20 and a distal end of respective inferior lateral connection point 24.

Figure 3:
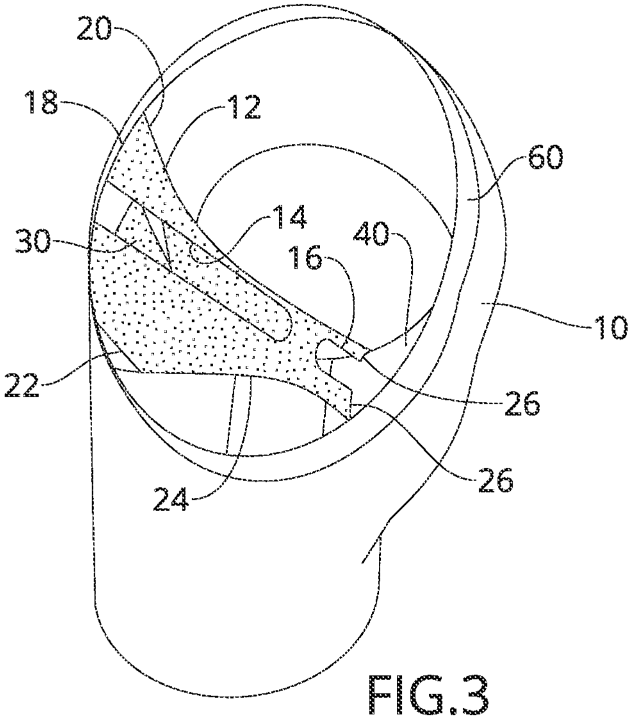
FIG. 3 is a top rear perspective view of an exemplary embodiment of the present invention.
Figure 4:
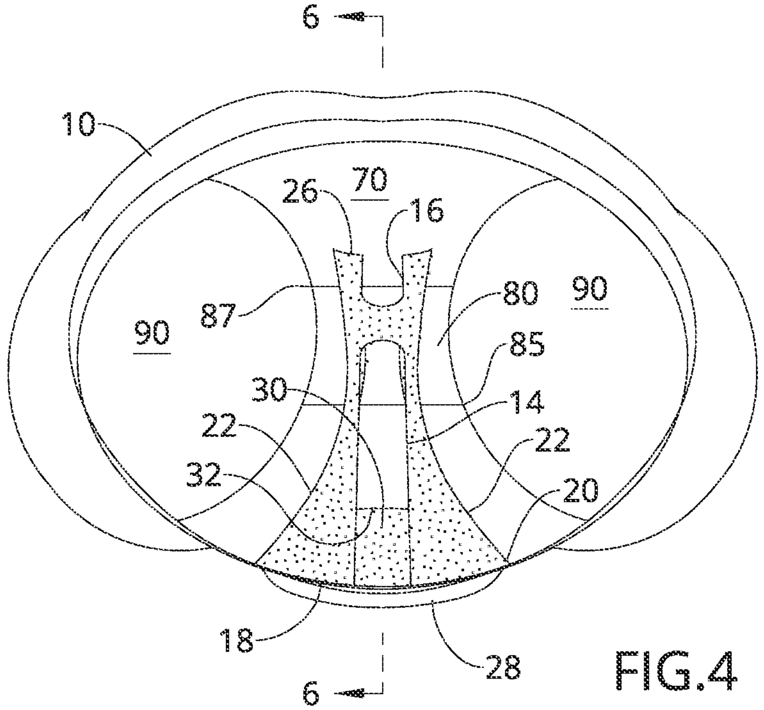
FIG. 4 is a top plan view of an exemplary embodiment of the present invention.
Figure 5:
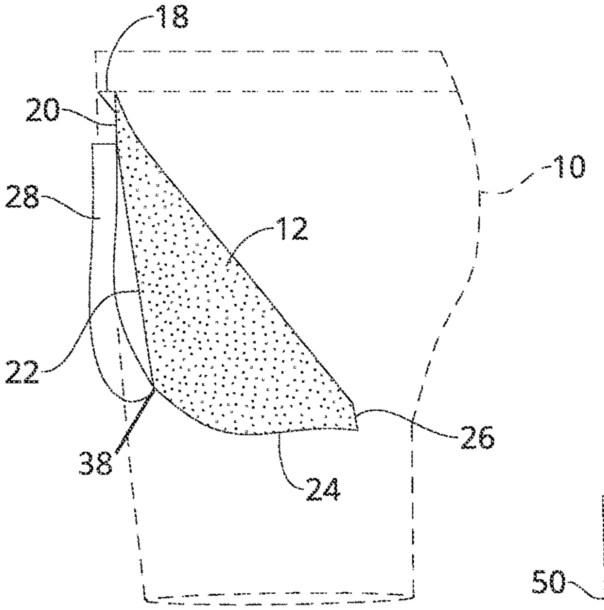
FIG. 5 is a side elevation view of an exemplary embodiment of the present invention with the remainder of the undergarment shown in dashed lines or otherwise hidden for the sake of clarity.

An anterior slot 14 may be formed in the barrier layer 12. The anterior slot may extend from adjacent the waistband/anterior connection point 18 to more than half of the longitudinal length of the barrier layer 12 (the longitudinal axis deemed extending between the anterior and posterior connection points 18 and 26). A rear slot 16 may extend from adjacent the posterior connection points to less than a third of the longitudinal length of the barrier layer 12. Each of the anterior and posterior slots 14, 16 may be generally U-shaped and have a rounded end that face each other as illustrated in FIG. 3.

Figure 6:
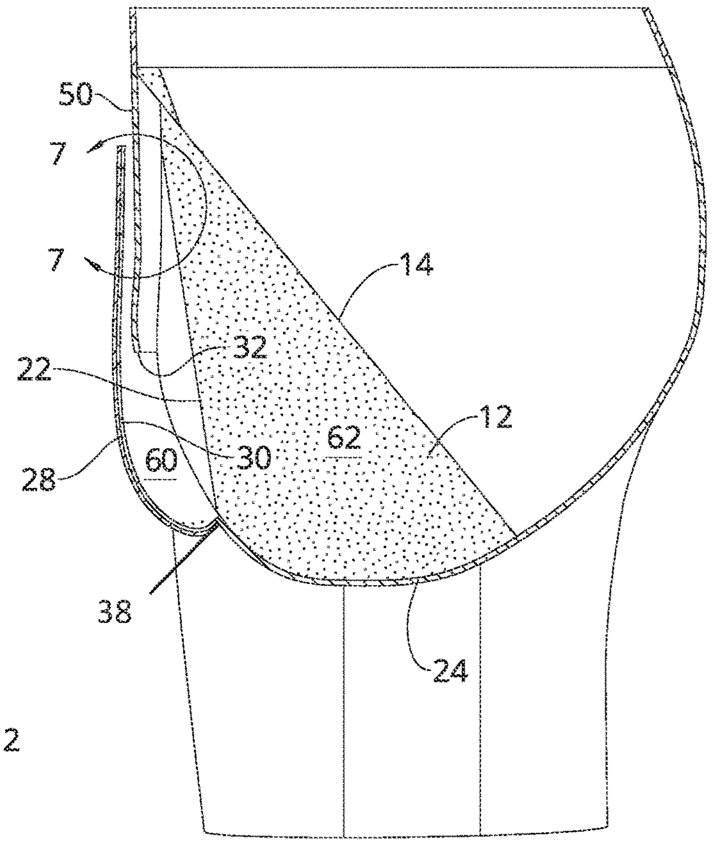
FIG. 6 is a section view of an exemplary embodiment of the present invention, taken along line 6-6 in FIG. 4.
Figure 7:
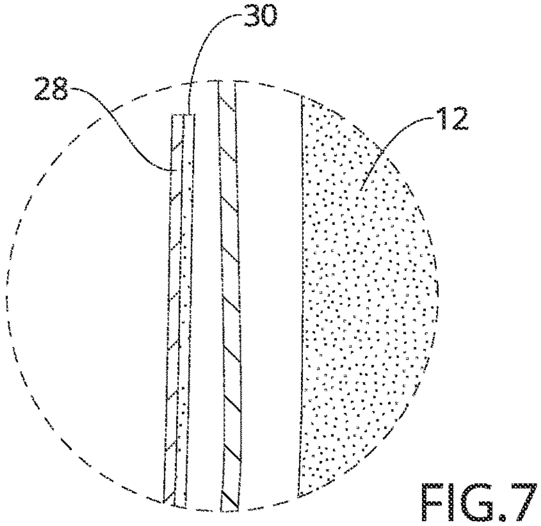
FIG. 7 is a detailed section view, taken along line 7-7 in FIG. 6.

The anterior slot 14 communicates with an anterior, phallic pouch 60. The phallic pouch 60 is defined, along an anterior portion, by an anterior panel 28. The anterior panel 28 depends from the waistband of the undergarment 10, and, on its other, inferior end, connects along a distal medial edge 38 of the crotch gusset 80, as shown in FIG. 6, generally at elevation between the anterior and posterior connection points 18, 26. The inferior edge of the anterior panel 28 may connect along a portion of a front latitudinal edge 85, by way of a front seam. Because of the pendulous sizing of the anterior panel 28, the anterior, phallic pouch 60 is defined between the anterior panel and the barrier layer 12.

Figure 8:
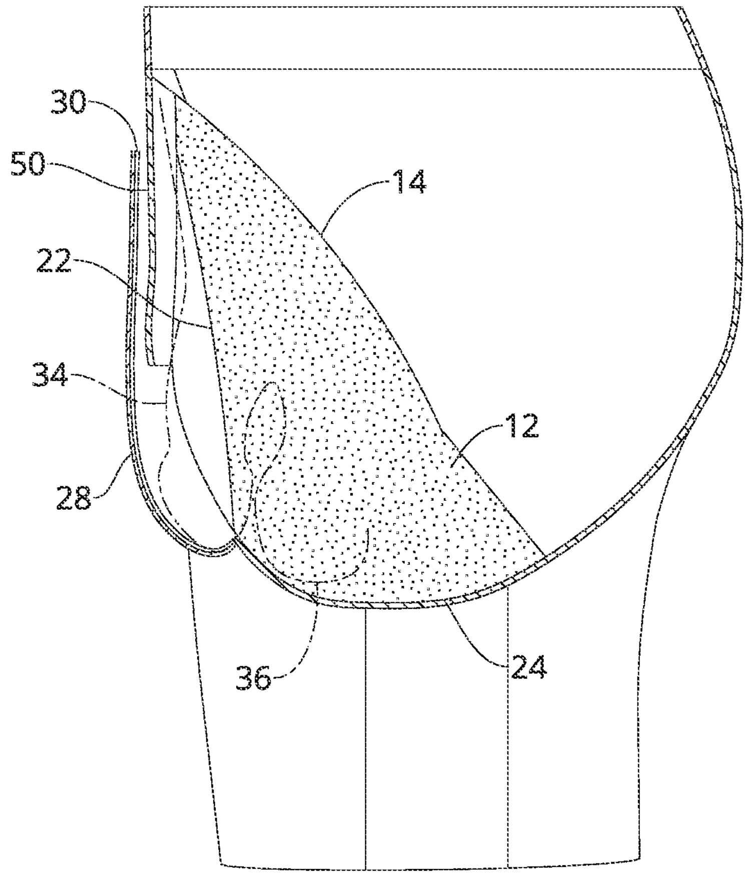
FIG. 8 is a section view, analogous to FIG. 6, of an exemplary embodiment of the present invention shown in use.

When worn, the penis 34 of the wearer resides in the anterior or phallic pouch 60, as illustrated in FIG. 8, while their scrotum 36 resides in an adjunct, scrotal pouch 62. To so reside in the phallic pouch 60 and the scrotal pouch 62, the penis 34 and scrotum 36, respectively are first placed through the anterior slot 14, Then, to so place the penis 34 in the anterior pouch 60, the penis 34 is urged through a pouch opening defined, along a superior perimeter, by the inferior edge 32 of the front panel 50. The scrotal pouch 62 is separated by the anterior, phallic pouch 60 by way of the distal medial edge 38, which is critical to the comfort of the wearer. Specifically, the sub-pouch depends or extends inferiorly more than the anterior pouch 60, whereby the distal medial edge 38, in effect, acts a fulcrum that bears some of the weight the anterior panel 28 and the barrier layer 12. Also, the front panel 50 may be disconnected from the anterior panel 28 so as to define a horizontal fly, through which the wearer can place their penis 34 through to urinate.

Along the surface of the anterior panel 28 a radiation-blocking liner 30 may be provided. This radiation-blocking liner 30 may be present along an inner surface of the barrier layer 12, in some embodiments. Alternatively, barrier layer 12 may be made with radiation-blocking fabric. When the male genitalia pass through the anterior slot 14 so that the barrier fabric 12 rests on the sides and behind the male genitalia, the barrier layer 12 blocks radiation coming from the sides and behind the genitalia from reaching the male genitalia. The anterior panel 28, in some embodiments, may be made with radiation-blocking fabric. The anterior panel 28 and barrier layer 12 are dimensioned and adapted so that when the wearer wears the undergarment, the anterior panel 28 rests in front of and partially below the genitals, while the barrier layer 12 shields the remaining bottom coverage of the genitals as well as left and right sides of the male genitalia and therefore blocks radiation coming from the front, below and left and right directions of the genitalia from reaching the male genitalia.

The undergarment holds the barrier layer 12 and anterior panel 28 in place and around the male genitalia so that the barrier layer 12 and the anterior panel 28 properly form the three-dimensional enclosure inside the undergarment for the male genitalia to rest in when the undergarment is worn.

A method of manufacturing the present invention may include the following. A manufacturer may provide a U-shaped piece (barrier layer 12) cut out from the center to form the anterior slot 14 for the male genitalia to pass through. After the genitalia passes through the smaller U-shaped opening, the barrier layer 12 rests behind and to the sides of the male genitalia as well as rests below the perineum area because the anterior of the barrier layer 12 is connected (through stitching, adhesion, bonding, or the like) to waistband of the undergarment 10 (near the mons pubis), the posterior of the barrier layer 12 is connected (through stitching, adhesion, bonding, or the like) to the posterior portion of the crotch gusset 80 along its rear gusset seam 87 of the undergarment 10 (near the wearer's perineum and gluteal cleft), and the left and right sides of the posterior half of the barrier layer 12 are connected (through stitching, adhesion, bonding, or the like) to the crotch gusset 80 or gusset of the underwear 10. By connecting the barrier layer 12 to the undergarment 10 in these locations, a deeper, more spacious three-dimensional shape is created by the barrier layer 12 when wearing the undergarment. By connecting the barrier layer 12 to the anterior gusset seam in a downward sloped configuration, the pouch is constructed in a way where wearing the garment causes the barrier layer 12 to stretch and form a three-dimensional, diagonal shape inside the undergarment 10. The bottom part of the barrier layer 12 conforms around a wearer's perineum, and the top part of the barrier layer 12 conforms around the wearer's mons pubis.

In addition to the "U"-shaped anterior slot 14 cut out from the center of the barrier layer 12, the left and right sides of the top half of the barrier layer 12 is cut in a straight vertical line. When connecting the barrier layer 12 to the undergarment 10, the straight vertical left and right sides of the barrier layer 12 are not connected to the undergarment 10, therefore, creating a hole between the undergarment and the barrier layer 12 on the left and right sides. This enables the barrier layer 12 to stretch more and create a 3-dimensional shape that offers more room for the male genitalia, to create a more form-fitting fit for the undergarment, have a better fit for the male genitalia and create the barrier layer 12 for the wearer to separate their genitalia from their thighs. The two-gap 22 construction method, when combined with connecting the barrier layer 12 to the posterior gusset seam of the crotch gusset 80, are essential for achieving the deep, diagonal three-dimensional shape inside the undergarment.

The bottom part of the barrier layer 12 has a smaller, upside-down U-shape cut out from the barrier layer 12 to create the posterior slot 16 near the wearer's perineum. The primary purpose of this posterior slot 16 is to reduce the amount of fabric required to make the barrier layer 12 as well as to increase airflow around the wearer's genitals. The combination of the posterior slot 16 and the side gaps 22 is to offer greater airflow and ventilation around the wearer's genitals and perineum area.

The second component is the anterior panel 28 that sits in front of the male genitalia, even when the genitalia pass through the opening in the barrier layer 12. The anterior panel 28 is secured to the crotch area of undergarments that is usually located where the undergarment fly opening is. When the undergarment is worn, the anterior panel 28 curves to the left and right sides of the male genitalia as well as curves below the male genitalia.

The third component is an undergarment. Both the barrier layer 12 and anterior panel 28 are connected to the inside of an undergarment to create the three-dimensional genital enclosure.

A method of using the present invention may include the following. A male would wear the present invention very similarly to how they would wear regular undergarments. First, by placing their legs through the large waistband opening at the top and two large leg openings at the bottom of the undergarment and then pulling the undergarment up to their waist. Because the barrier layer is connected to the waistband of the undergarment as well as to the posterior gusset seam of the undergarment, the barrier layer stretches to a sloped configuration to create a three-dimensional enclosure for the male genitalia to rest in. When the undergarment is worn by the wearer, the barrier layer stretches vertically and therefore the U-shaped anterior slot at the superior portion of the barrier layer stretches well enough for the male genitalia to pass through the U-shaped opening naturally and unassisted (i.e., the wearer is not required to use their hands to assist in guiding or placing the male genitalia through the U-shaped opening).

After the undergarment is worn properly and securely at the wearer's waist, the male genitalia will naturally rest inside the three-dimensional enclosure that is made by the barrier layer and anterior panel. Because the barrier layer and anterior are both made with radiation-blocking fabric and because of how the barrier layer and anterior are connected to the undergarment, radiation will be blocked and not reach the male genitalia from several directions including the front, below, the sides and behind the male genitalia.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. An undergarment having an internal pouch for shielding male genitalia from radiation as well as separating the scrotum from the inner thighs, the undergarment comprising:

a crotch gusset interconnecting two leg holes of the undergarment, wherein an anterior edge of the crotch gusset defines an anterior opening of the undergarment;

an anterior panel depending from a superior portion of the undergarment adjacent the anterior opening;

a barrier layer extending in a sloped configuration between said superior portion to a posterior portion of the crotch gusset;

a lateral connection between each of two opposing lateral edges of the barrier layer and the crotch gusset, wherein the lateral connections extend between said anterior edge and said posterior portion of the crotch gusset, thereby defining a gap between each lateral connection and the anterior panel and below the superior portion; and an inferior edge of the anterior panel connected to said anterior edge of the crotch gusset so as to form an inflection point between a phallic pouch and a scrotal pouch posterior thereof.

2. The undergarment of claim 1, wherein the phallic pouch is configured to accommodate a penis of a wearer of the undergarment.

3. The undergarment of claim 2, wherein the scrotal pouch is configured to accommodate a scrotum of the wearer of the undergarment.

4. The undergarment of claim 1, wherein the anterior panel and the barrier layer comprise radiation blocking material.

5. The undergarment of claim 1, wherein an anterior connection directly connects the barrier layer and the superior portion.

6. The undergarment of claim 1, wherein a posterior connection directly connects the barrier layer and said posterior portion.

7. The undergarment of claim 1, further comprising a front panel depending directly from said superior portion, wherein an inferior edge of the front panel defines, in part, a superior edge to the anterior opening.

8. The undergarment of claim 7, wherein a superior edge of the anterior panel directly connects to the front panel.

9. The undergarment of claim 1, wherein the superior portion is a waistband.

10. The undergarment of claim 9, wherein the waistband is superior to a superior edge of the anterior panel.

11. The undergarment of claim 1, wherein the inflection point is defined by a distal medial edge, wherein the scrotal pouch depends lower than the phallic pouch relative to the distal medial edge.

12. The undergarment of claim 11, wherein the distal medial edge acts as a weight bearing connection from which the scrotal pouch and the phallic pouch bear.

13. The undergarment of claim 1, wherein the anterior panel defines a curvature along a bottom portion of the phallic pouch.

* * * * *